United States Patent
Kurita et al.

(10) Patent No.: US 12,130,746 B2
(45) Date of Patent: Oct. 29, 2024

(54) MEMORY SYSTEM AND METHOD

(71) Applicant: KIOXIA CORPORATION, Tokyo (JP)

(72) Inventors: Takahiro Kurita, Sagamihara Kanagawa (JP); Shinichi Kanno, Ota Tokyo (JP)

(73) Assignee: Kioxia Corporation, Tokyo (JP)

( * ) Notice: Subject to any disclaimer, the term of this patent is extended or adjusted under 35 U.S.C. 154(b) by 81 days.

(21) Appl. No.: 17/898,307

(22) Filed: Aug. 29, 2022

(65) Prior Publication Data

US 2023/0297514 A1 Sep. 21, 2023

(30) Foreign Application Priority Data

Mar. 15, 2022 (JP) .................................. 2022-040569

(51) Int. Cl.
*G06F 12/10* (2016.01)
*G06F 3/06* (2006.01)

(52) U.S. Cl.
CPC ............ *G06F 12/10* (2013.01); *G06F 3/0638* (2013.01); *G06F 3/0679* (2013.01)

(58) Field of Classification Search
CPC ...... G06F 12/0246; G06F 12/04; G06F 12/10; G06F 3/0679; G06F 3/0638; G06F 3/061; G06F 2212/1016; G06F 2212/7201; G06F 2212/7205; G06F 2212/7208
USPC ........................................................ 711/154
See application file for complete search history.

(56) References Cited

U.S. PATENT DOCUMENTS

| | | | |
|---|---|---|---|
| 9,946,462 B1 | 4/2018 | Li et al. | |
| 10,824,570 B2 * | 11/2020 | Kaburaki | G06F 12/0246 |
| 2014/0019579 A1 * | 1/2014 | Motwani | G06F 3/0647 |
| | | | 709/216 |
| 2018/0314441 A1 * | 11/2018 | Suryanarayana | G06F 3/0683 |
| 2021/0026548 A1 | 1/2021 | Kang | |
| 2022/0398201 A1 * | 12/2022 | Goto | G06F 3/061 |

FOREIGN PATENT DOCUMENTS

JP 2020-113187 A 7/2020

\* cited by examiner

*Primary Examiner* — Hashem Farrokh
(74) *Attorney, Agent, or Firm* — Kim & Stewart LLP

(57) ABSTRACT

A memory system includes a nonvolatile memory and a controller configured to control the nonvolatile memory based on an address conversion table. The controller is configured to generate first address mapping information indicating a first logical address range and a first physical address range, and then second address mapping information indicating a second logical address range and a second physical address range, determine whether the first and second logical address ranges are continuous and the first and second physical address ranges are continuous, upon determining non-continuity of the logical or physical address ranges, update the address conversion table based on the first address mapping information, and upon determining continuity of the logical and physical address ranges, generate integrated address mapping information using the first and second address mapping information and update the address conversion table based on the integrated address mapping information.

20 Claims, 13 Drawing Sheets

MEMORY SYSTEM AND METHOD

CROSS-REFERENCE TO RELATED APPLICATION

This application is based upon and claims the benefit of priority from Japanese Patent Application No. 2022-040569, filed Mar. 15, 2022, the entire contents of which are incorporated herein by reference.

FIELD

Embodiments described herein relate generally to a memory system and a method.

BACKGROUND

A memory system including a nonvolatile memory is widely used. As one of such a memory system, for example, a solid state drive (SSD) including a NAND flash memory is known. The SSD is often used as a storage for an information processing apparatus such as a server or a personal computer.

The SSD executes a process to convert a logical address into a physical address indicating a physical location on the nonvolatile memory. The logical address is designated by a host such as an information processing apparatus. The process to convert a logical address into a physical address or converting a physical address into a logical address is also called address resolution.

The SSD manages a correspondence relationship between the logical address and the physical address by using an address conversion table also called an L2P (logical block address (LBA) to physical block address (PBA)) table for address resolution. In the SSD, it is desirable to reduce the processing cost attributable to address resolution.

DETAILED DESCRIPTION

Embodiments provide a memory system and a method that can reduce a processing cost of an address conversion table.

In general, according to an embodiment, a memory system includes a nonvolatile memory and a controller configured to control the nonvolatile memory based on an address conversion table. The controller is configured to generate first address mapping information indicating a first logical address range and a first physical address range corresponding thereto, and then second address mapping information indicating a second logical address range and a second physical address range corresponding thereto, determine whether the first and second logical address ranges are continuous and the first and second physical address ranges are continuous, upon determining that at least one of the first and second logical address ranges and the first and second physical address ranges is not continuous, update the address conversion table based on the first address mapping information, and upon determining that the first and second logical address ranges are continuous and the first and second physical address ranges are continuous, generate integrated address mapping information using the first and second address mapping information and update the address conversion table based on the integrated address mapping information.

Hereinafter, one or more embodiments will be described with reference to the drawings.

Figure 1:
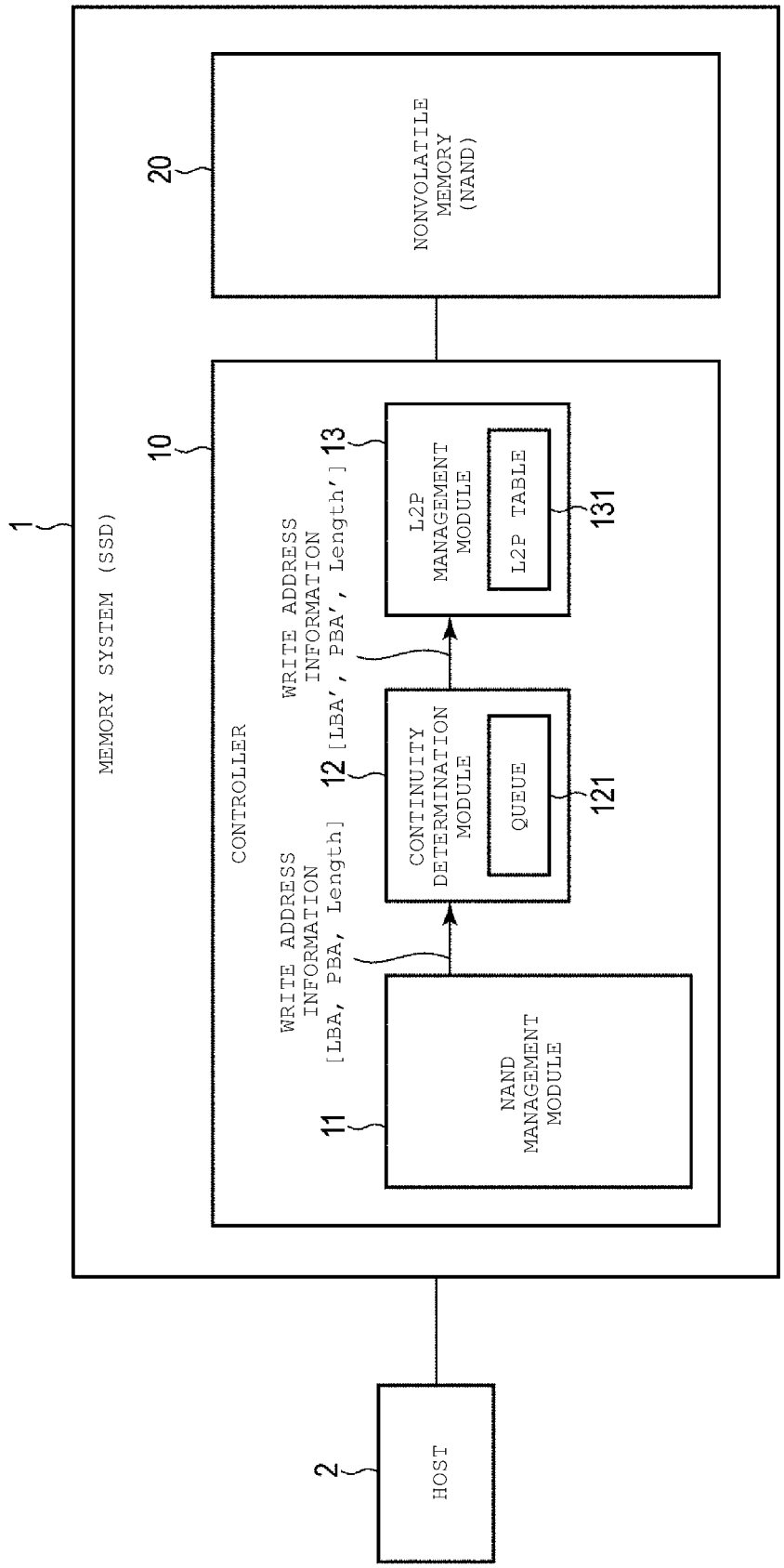
FIG. 1 is a diagram illustrating a configuration example of a memory system according to an embodiment.

FIG. 1 is a diagram illustrating a configuration example of a memory system 1 according to an embodiment. FIG. 1 also illustrates a configuration example of an information processing system including the memory system 1 and a host 2 connected to the memory system 1. The host 2 is an information processing apparatus such as a server or a personal computer.

The memory system 1 includes a controller 10 and a nonvolatile memory 20. The nonvolatile memory 20 is a NAND flash memory (NAND). Here, a case where the memory system 1 is an SSD is described as an example.

The controller 10 controls the nonvolatile memory 20. The controller 10 can perform communication with the host 2 in accordance with a protocol conforming to, for example, an NVM Express™ (NVMe™) specification. The controller 10 controls data writing to the nonvolatile memory 20 and data reading from the nonvolatile memory 20 according to commands from the host 2. Other than when a command is received from the host 2, in some cases, the controller 10 may independently control data writing to the nonvolatile memory 20 and data reading from the nonvolatile memory 20 in order to appropriately maintain, for example, a state of the nonvolatile memory 20 or a state of data stored in the nonvolatile memory 20. The controller 10 is configured with, for example, a system-on-chip (SoC).

The controller 10 includes a NAND management module 11, a continuity determination module 12, and an L2P management module 13.

The NAND management module 11 executes management of a storage area of the nonvolatile memory 20. The management includes mapping of a physical address space to a logical address space. For example, when issuing a write command to the memory system 1, the host 2 designates a data write location by using a logical address indicating a logical location of the nonvolatile memory 20. The logical address is, for example, a logical block address (LBA). In the write command, a length of data to be written is designated. The NAND management module 11 performs control for correlating a location of the nonvolatile memory 20 to which data is written, that is, a physical address indicating a physical location of the nonvolatile memory 20, with the logical address designated by the host 2. Specifically, the NAND management module 11 outputs write address information for updating an address conversion table (L2P table 131 to be described below), which stores a correspondence relationship between a logical address and a physical address, to be a latest state. The physical address is, for example, a physical block address (PBA).

The write address information includes a logical address (e.g., LBA) designated as a data write destination by the host 2, a physical address (e.g., PBA) indicating a physical location of the nonvolatile memory 20 at which data is to be actually written, and a data length (Length). The data length is represented by the number of LBAs or PBAs.

The address conversion table is managed as the L2P table 131 by the L2P management module 13. Therefore, the write address information output by the NAND management module 11 is originally information that is to be supplied to the L2P management module 13. In the memory system 1 according to the embodiment, the continuity determination module 12 is interposed between the NAND management module 11 and the L2P management module 13. The continuity determination module 12 includes a queue 121 for buffering the write address information which is output from the NAND management module 11. In order to reduce a processing cost of the L2P table 131, the continuity determination module 12 buffers and processes the write address information output from the NAND management module 11 in the queue 121, and supplies the processed write address information to the L2P management module 13. By processing of the write address information by the continuity determination module 12, the memory system 1 according to the embodiment can reduce the processing cost of the L2P table 131. This point will be described in detail below.

First, a structure of the L2P table 131 and management of the L2P table 131 by the L2P management module 13 will be described with reference to FIG. 2.

In the memory system 1 according to the embodiment, the L2P table 131 has a hierarchical structure called a tree structure or the like. The L2P management module 13 stores, in a first node, information indicating a one-to-one correspondence between the LBA and the PBA, and the first node is provided in the lowest layer of the hierarchical structure of the L2P table 131. In FIG. 2, (A) illustrates an example in which, for example, information indicating that a PBA "32" is correlated with an LBA "16" is stored in one of eight first nodes. The L2P management module 13 basically executes update of the first nodes based on the write address information.

Further, the L2P management module 13 stores, in a second node, information indicating whether or not a predetermined number of continuous PBAs is correlated with a predetermined number of continuous LBAs, and the second node is provided in an upper layer of the first nodes in the hierarchical structure of the L2P table 131. In FIG. 2, (A) illustrates an example in which a second node is provided for eight first nodes.

Figure 2:
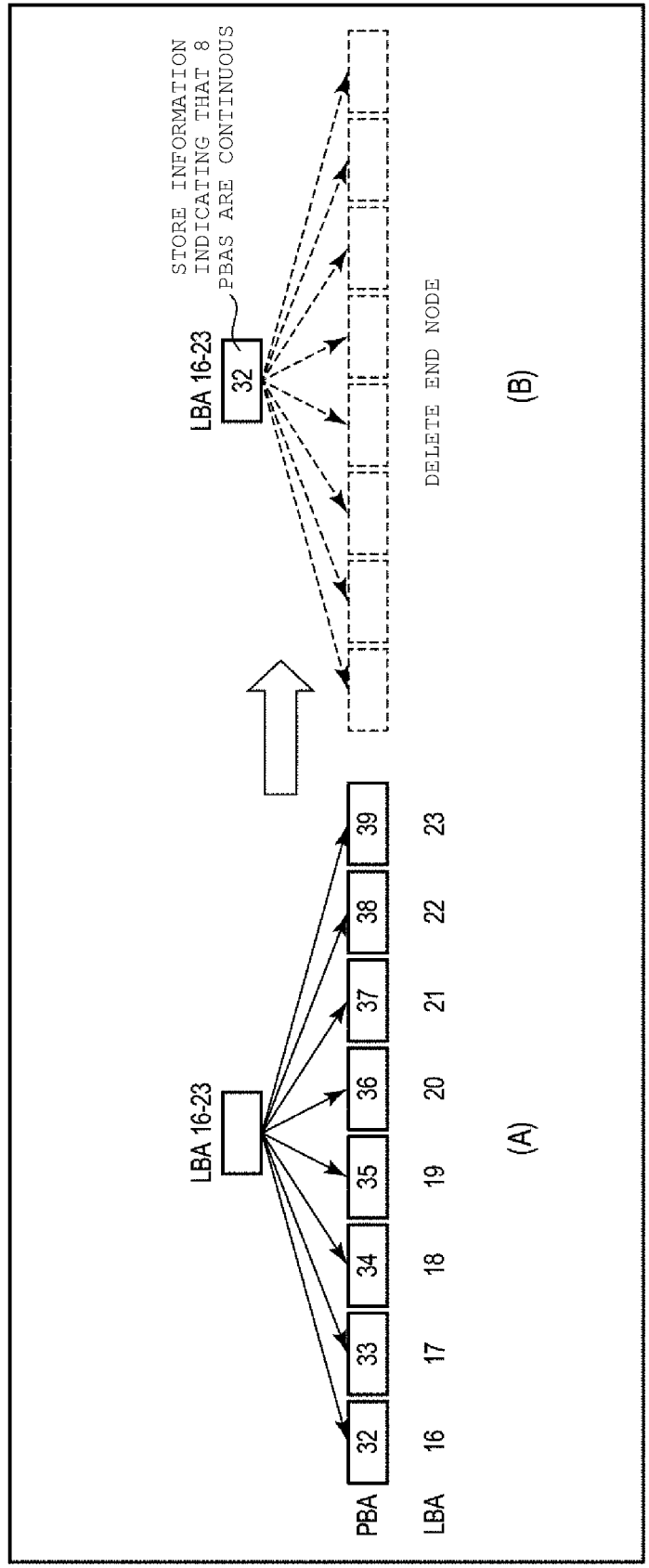
FIG. 2 is a diagram illustrating a structure of an L2P table used in the memory system according to the embodiment.

In a case of the example illustrated in (A) of FIG. 2, in the eight first nodes which are provided in a lower layer of a certain second node, information indicating that continuous PBAs ("32-39") are correlated with continuous LBAs ("16-23") is stored. Therefore, in the second node, information indicating that eight continuous PBAs are correlated with eight continuous LBAs is stored together with the leading PBA "32".

Further, for example, in a case where a third node is further provided in the upper layer of a plurality of second nodes, information indicating that eight continuous PBAs are correlated with eight continuous LBAs is stored in all of a predetermined number of second nodes which are provided in a lower layer of a certain third node. In such a case, the L2P management module 13 stores, in the third node, information indicating that (predetermined number×8) continuous PBAs are correlated with (predetermined number×8) continuous LBAs together with the leading PBA.

For example, when a read command is issued by the host 2, the controller 10 acquires a PBA corresponding to an LBA designated by the read command by referring to the L2P table 131. At this time, when information indicating that continuous PBAs are correlated is stored in a third node or a second node corresponding to the designated LBA, the controller 10 can acquire a target PBA without tracing a first node in the lowest layer.

Further, when a PBA correlated with a certain LBA can be acquired by the third node, nodes in lower layers of the third node are unnecessary. Similarly, when a PBA correlated with a certain LBA can be acquired by the second node, nodes in the lower layer of the second node are unnecessary. The L2P management module 13 appropriately deletes (may be referred to as clears) unnecessary nodes in order to reduce a total size of the L2P table 131. In FIG. 2, (B) illustrates an example in which the L2P management module 13 stores information indicating that eight continuous PBAs starting from the PBA "32" are correlated in the second node corresponding to the LBAs "16-23" and deletes eight first nodes provided in the lower layer of the second node. The deletion of the terminal nodes illustrated in (B) in FIG. 2 is also referred to as "pruning" or the like. The terminal node is not limited to a node in the lowest layer (first node).

Next, an operation of the continuity determination module 12 for improving efficiency of processing that is performed by the L2P management module 13 by using the L2P table 131 and includes the "pruning" will be described.

Figure 3:
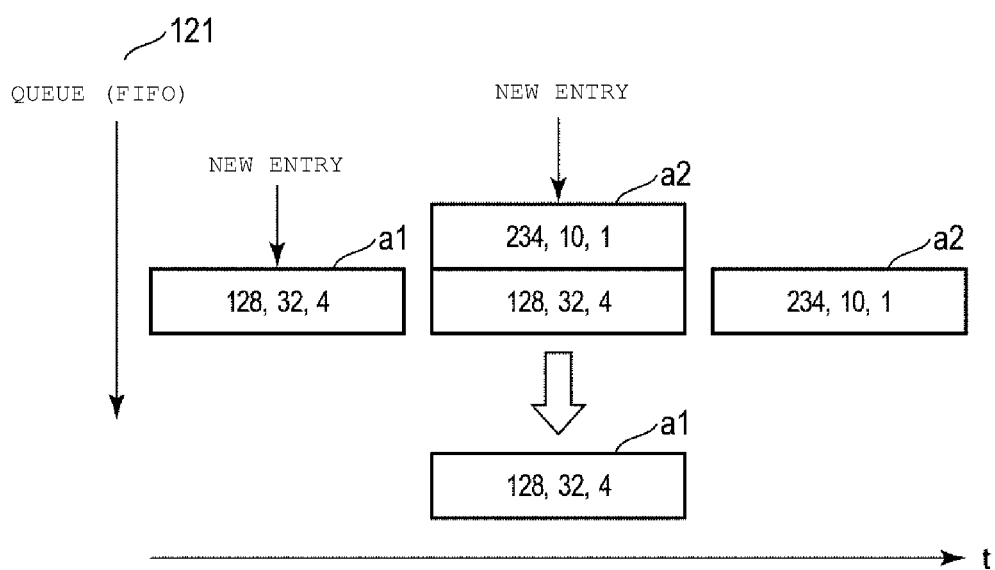
FIG. 3 is a diagram illustrating a first example of an operation of a continuity determination module of the memory system according to the embodiment.

FIG. 3 is a diagram illustrating a first example of an operation of the continuity determination module 12.

FIG. 3 illustrates an example in which write address information (a1) including an LBA "128", a PBA "32", and a Length "4" is first input to the queue 121. The write address information including these pieces of information is hereinafter referred to as write address information "128, 32, 4". The queue 121 is, for example, a first-in-first-out (FIFO) data buffer.

Further, FIG. 3 illustrates an example in which write address information "128, 32, 4" (a1) is buffered in the queue 121 and write address information "234, 10, 1" (a2) is newly input to the queue 121. The continuity determination module 12 determines whether or not the write address information "128, 32, 4" (a1) which is buffered in the queue 121 and the write address information "234, 10, 1" (a2) which is newly input to the queue 121 are continuous in both LBA and PBA.

Specifically, the continuity determination module 12 first calculates a next-expected LBA and a next-expected PBA from the write address information "128, 32, 4" (a1). That is, the continuity determination module 12 calculates an LBA and a PBA that follow the storage area indicated by the write address information buffered in the queue 121. Here, the continuity determination module 12 calculates an LBA "132 (=128+4)" and a PBA "36 (=32+4)". Next, the continuity determination module 12 determines whether or not both the calculated LBA and the calculated PBA match with the LBA and the PBA of the write address information "234, 10, 1" (a2) by comparing the calculated LBA and the calculated PBA with the LBA and the PBA of the write address information "234, 10, 1" (a2).

In a case of the first example illustrated in FIG. 3, the calculated LBA and the calculated PBA do not match with the LBA and the PBA of the newly-input write address information. When the calculated LBA and the calculated PBA do not match with the LBA and the PBA of the newly-input write address information, that is, when the LBAs and the PBAs are discontinuous, the continuity determination module 12 outputs (may be referred to as removes or de-queues) the write address information "128, 32, 4" (a1) from the queue 121. That is, the write address information which is output from the NAND management module 11 is directly output from the continuity determination module 12 to the L2P management module 13. The queue 121 transitions to a state in which the write address information "234, 10, 1" (a2) is buffered.

When the write address information "128, 32, 4" (a1) is supplied, the L2P management module 13 executes update of the L2P table 131 so as to store a correspondence relationship between the LBAs "128 to 131" and the PBAs "32 to 35" using four first nodes in the lowest layer.

Further, the continuity determination module 12 calculates a next-expected LBA "235 (=234+1)" and a next-expected PBA "11 (=10+1)" from the write address information "234, 10, 1" (a2), and waits for an input of new write address information to the queue 121. The next-expected LBA and the next-expected PBA may be calculated when new write address information is input to the queue 121.

Figure 4:
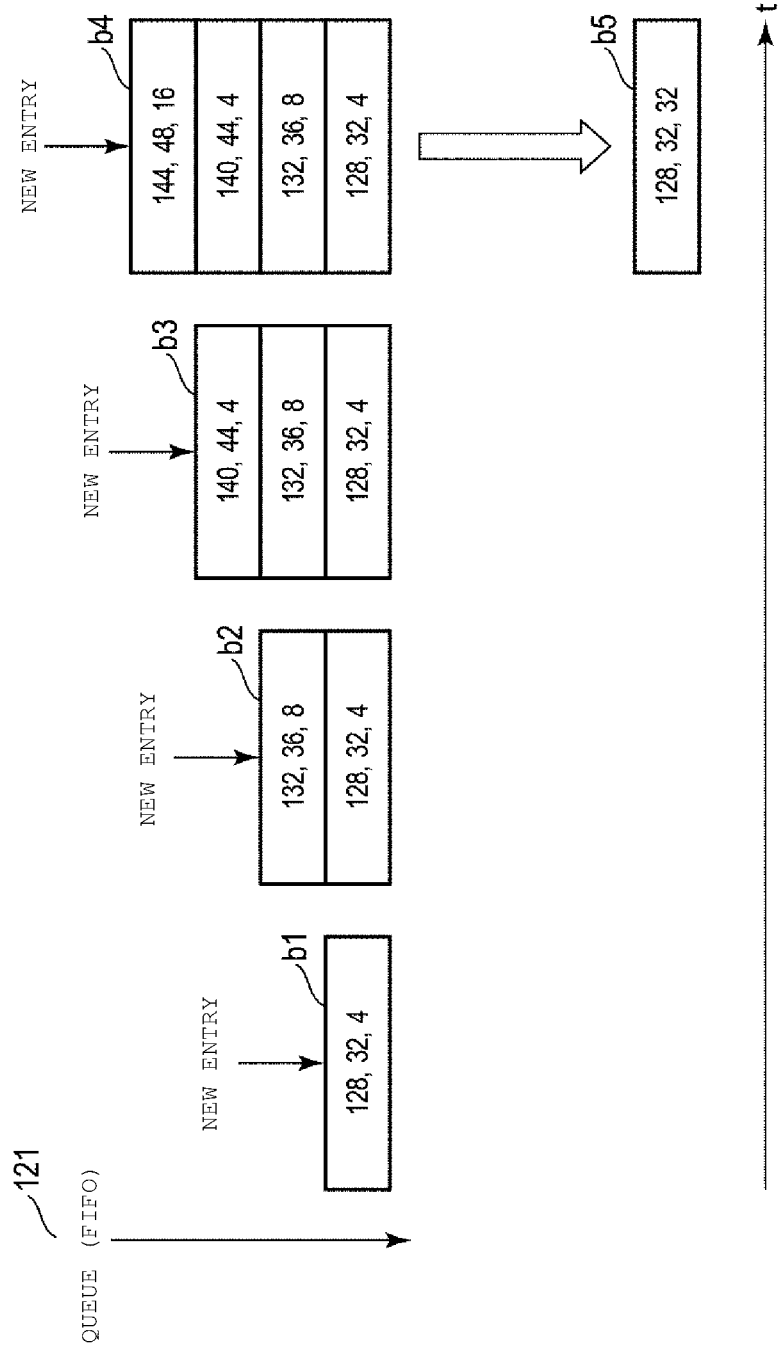
FIG. 4 is a diagram illustrating a second example of an operation of the continuity determination module of the memory system according to the embodiment.

FIG. 4 is a diagram illustrating a second example of an operation of the continuity determination module 12.

FIG. 4 illustrates an example in which write address information "128, 32, 4" (b1) is first input to the queue 121. Further, FIG. 4 illustrates an example in which write address information "128, 32, 4" (b1) is buffered in the queue 121 and write address information "132, 36, 8" (b2) is newly input to the queue 121. As described in the first example described above, the continuity determination module 12 calculates a next-expected LBA "132" and a next-expected PBA "36" from the write address information "128, 32, 4" (b1), and determines whether or not both the calculated LBA and the calculated PBA match with the LBA and the PBA of the write address information "132, 36, 8" (b2) by comparing the calculated LBA and the calculated PBA with the LBA and the PBA of the write address information "132, 36, 8" (b2).

In a case of the second example illustrated in FIG. 4, both the calculated LBA and the calculated PBA match with the LBA and the PBA of the newly-input write address information. When both the calculated LBA and the calculated PBA match with the LBA and the PBA of the newly-input write address information, that is, when the LBAs and the PBAs are continuous, the continuity determination module 12 buffers, in the queue 121, the newly-input write address information "132, 36, 8" (b2) in addition to the write address information "128, 32, 4" (b1). At this time, the next-expected LBA and the next-expected PBA are an LBA "140 (=132+8)" and a PBA "44 (=36+8)".

In the case of the second example illustrated in FIG. 4, subsequently, write address information "140, 44, 4" (b3) in which both the LBAs and the PBAs are continuous is newly input to the queue 121. The continuity determination module 12 buffers, in the queue 121, the write address information "140, 44, 4" (b3) in addition to the write address information "128, 32, 4" (b1) and the write address information "132, 36, 8" (b2). At this time, the next-expected LBA and the next-expected PBA are an LBA "144 (=140+4)" and a PBA "48 (=44+4)".

In the case of the second example illustrated in FIG. 4, further, write address information "144, 48, 16" (b4) in which both the LBAs and the PBAs are continuous is newly input to the queue 121. The continuity determination module 12 buffers, in the queue 121, the write address information "144, 48, 16" (b4) in addition to the write address information "128, 32, 4" (b1), the write address information "132, 36, 8" (b2), and the write address information "140, 44, 4" (b3).

Here, it is assumed that a total length included in pieces of the write address information (b1 to b4) buffered in the queue 121 reaches a corresponding length of the second node provided in the upper layer of the first nodes (32 (=4+8+4+16)). FIG. 2 illustrates an example in which eight first nodes exist in the lower layer of the second node. On the other hand, in FIG. 4, it is assumed that 32 first nodes exist in the lower layer of one second node. The continuity determination module 12 processes pieces of the write address information such that pieces of the write address information (b1 to b4) are integrated into one piece of write address information "128, 32, 32" (b5), and outputs the write address information "128, 32, 32" (b5) from the queue 121 to the L2P management module 13.

When the write address information "128, 32, 32" (b5) is supplied, the L2P management module 13 stores a leading PBA "32" in the second node which is provided in the upper layer of the 32 first nodes in the lowest layer, stores information indicating that 32 PBAs are continuous from the PBA "32" in the second node, and executes "pruning" for deleting the 32 first nodes in the lower layer of the second node.

Assuming that the continuity determination module 12 does not exist and pieces of the write address information (b1 to b4) output from the NAND management module 11 are individually supplied to the L2P table 131, the L2P management module 13 would need to execute update of the L2P table 131 four times based on pieces of the write address information (b1 to b4). Further, when the write address information (b4) is independently supplied, whether or not "pruning" is executed when updating the L2P table 131 based on the write address information (b4) depends on specifications of the L2P management module 13. That is, when executing "pruning", it is necessary to check whether or not the PBAs are continuous from a leading node of the 32 first nodes under the second node.

By contrast, in the memory system 1 according to the embodiment, the continuity determination module 12 interposed between the NAND management module 11 and the L2P management module 13 processes pieces of the write address information as described above. Therefore, the L2P management module 13 can update the L2P table 131 by only one "pruning". Thereby, it is possible to reduce a processing cost of the L2P table 131.

Figure 5:
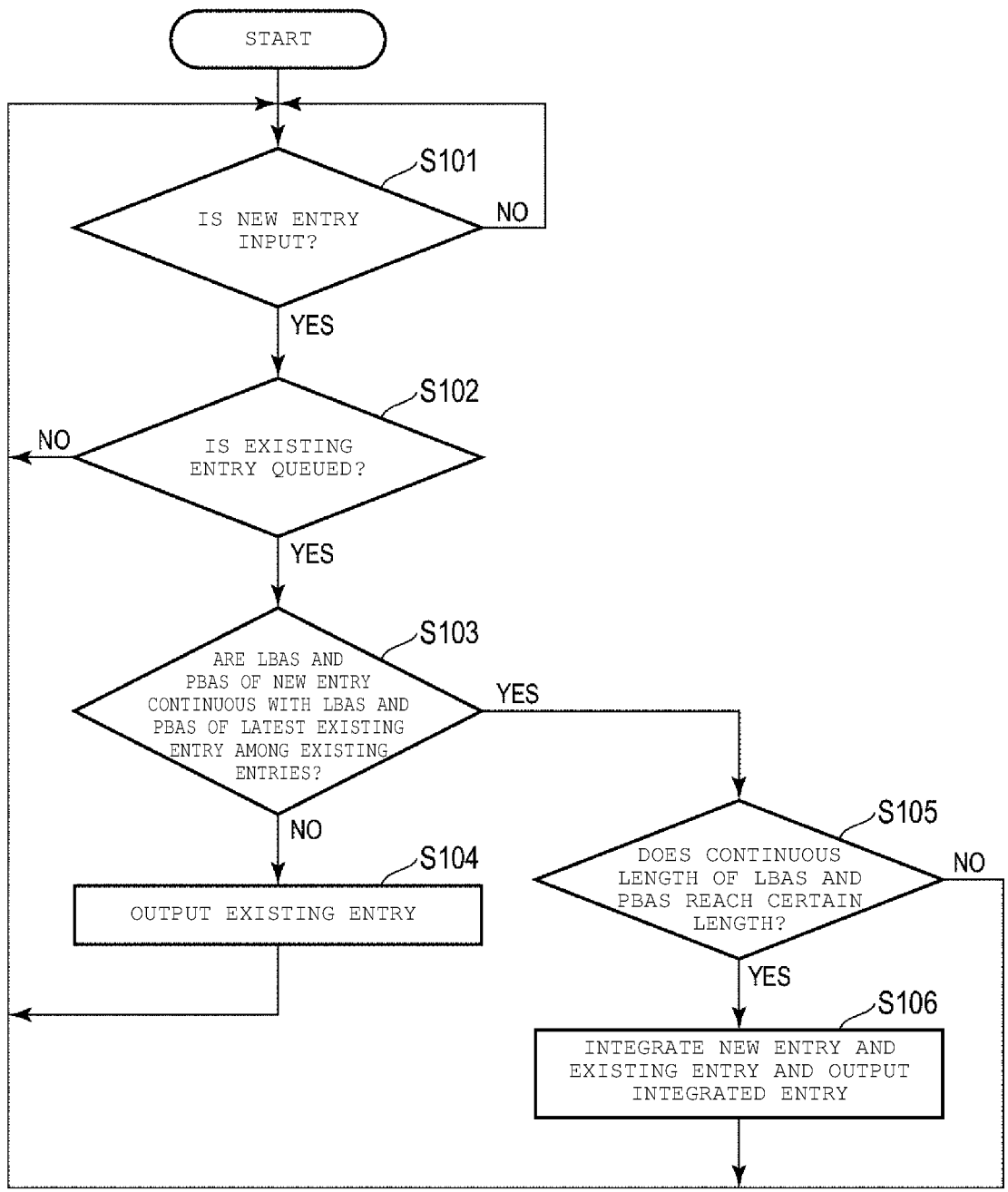
FIG. 5 is a flowchart illustrating an operation procedure of the continuity determination module of the memory system according to the embodiment.

FIG. 5 is a flowchart illustrating an operation procedure of the continuity determination module 12.

The continuity determination module 12 determines whether or not new write address information is input to the queue 121 (S101). When new write address information is not input (NO in S101), the continuity determination module 12 waits for an input of write address information.

When write address information is newly input (YES in S101), the continuity determination module 12 determines whether or not write address information is already buffered in the queue 121 (S102). When write address information is not buffered in the queue 121 (NO in S102), the continuity determination module 12 waits for an input of next write address information.

When write address information is already buffered in the queue 121 (YES in S102), the continuity determination module 12 determines whether or not both the LBAs and the PBAs of the write address information which is newly input to the queue 121 are continuous with the LBAs and the PBAs of the latest write address information among pieces of the write address information which are already buffered in the queue 121 (S103). When it is determined that the LBAs and the PBAs are not continuous (NO in S103), the continuity determination module 12 outputs the write address information which is already buffered in the queue 121 (S104). At this time, the queue 121 is in a state where only the newly-input write address information is buffered.

When it is determined that both the LBAs and the PBAs are continuous (YES in S103), the continuity determination module 12 determines whether or not a continuous length of the LBAs and the PBAs from the write address information which is first buffered in the queue 121 reaches a certain length, which may be referred to as a threshold value (S105). When it is determined that a continuous length of the LBAs and the PBAs does not reach a certain length (NO in S105), the continuity determination module 12 further waits for an input of next write address information. When it is determined that a continuous length of the LBAs and the PBAs reaches a certain length (YES in S105), the continuity determination module 12 integrates the write address information which is newly input to the queue 121 and the write address information which is already buffered in the queue 121 into one, and outputs the integrated write address information (S106). When the write address information is output, the continuity determination module 12 continues to wait for an input of write address information.

In this way, the continuity determination module 12 buffers the write address information in the queue 121 during a period for which the LBAs and the PBAs are continuous. When a continuous length of the LBAs and the PBAs reaches a predetermined length for which "pruning" can be performed, the continuity determination module 12 integrates pieces of the write address information which are buffered in the queue 121 into one, and outputs the integrated write address information. By processing the integrated write address information, the memory system 1 according to the embodiment can reduce the processing cost of the L2P table 131.

Figure 6:
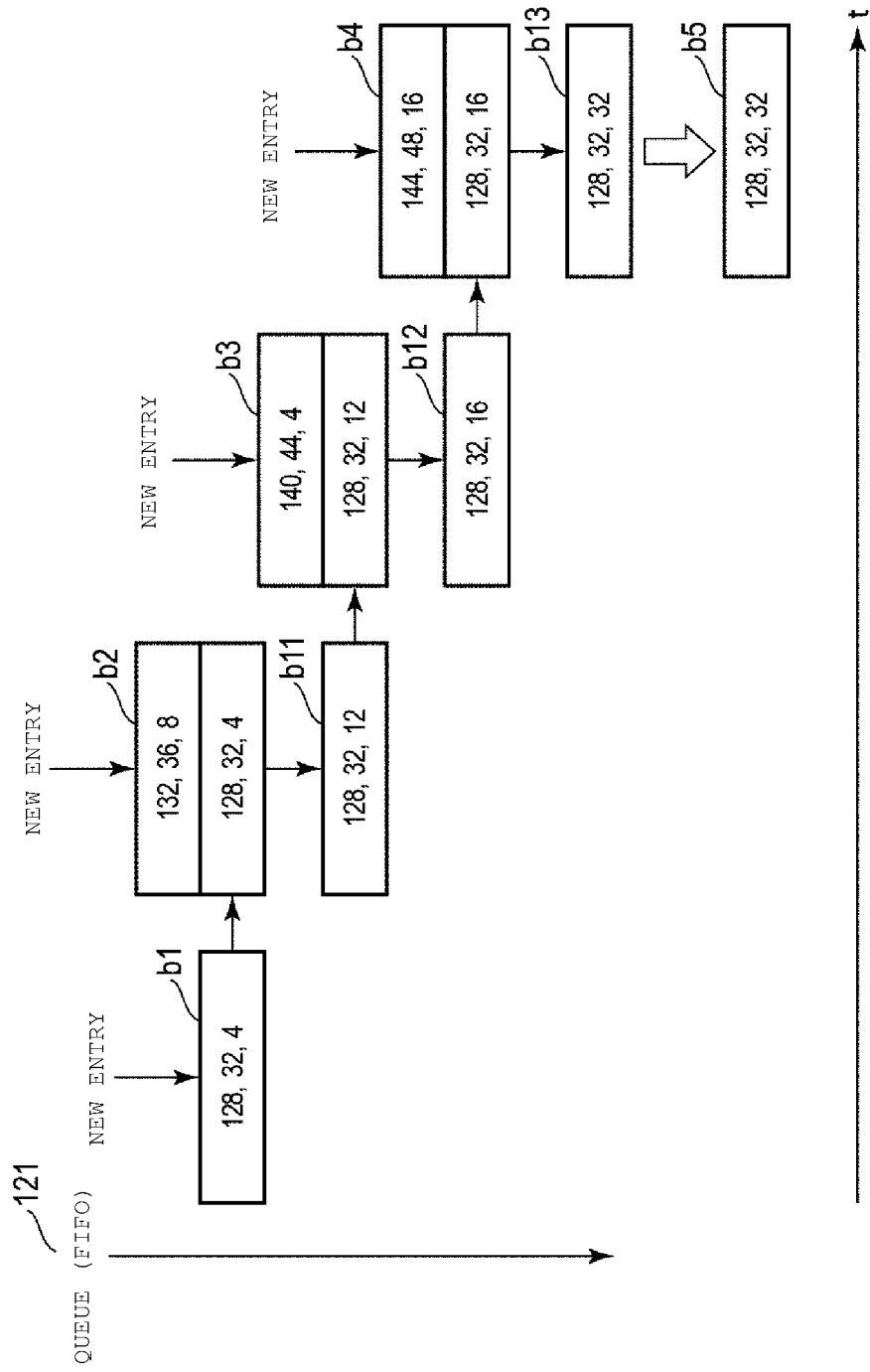
FIG. 6 is a diagram illustrating a modification example of the operation of the continuity determination module illustrated in FIG. 4.

FIG. 4 illustrates an example in which four pieces of the write address information (b1 to b4) in which the LBAs and the PBAs are continuous are respectively buffered in the queue 121. As illustrated in FIG. 6, the continuity determination module 12 may integrate two pieces of write address information into one each time new write address information is input to the queue 121, the new write address information being information in which the LBAs and the PBAs are continuous with the LBAs and the PBAs of the write address information which is already buffered in the queue 121.

Specifically, when write address information "128, 32, 4" (b1) is input to the queue 121 and then write address information "132, 36, 8" (b2) in which the LBAs and the PBAs are continuous is input, the continuity determination module 12 integrates these two pieces of the write address information into write address information "128, 32, 12" (b11). Next, when write address information "140, 44, 4" (b3) is input, the continuity determination module 12 integrates the write address information "128, 32, 12" (b11) and the write address information "140, 44, 4" (b3) into write address information "128, 32, 16" (b12). Further, when write address information "144, 48, 16" (b4) is input, the continuity determination module 12 integrates the write address information "128, 32, 16" (b12) and the write address information "144, 48, 16" (b4) into write address information "128, 32, 32" (b13). The write address information "128, 32, 32" (b13) corresponds to the write address information "128, 32, 32" (b5) of FIG. 4. The continuity determination module 12 outputs the write address information "128, 32, 32" from the queue 121 to the L2P management module 13.

In this case, the number of pieces of the write address information which are buffered in the queue 121 can be reduced. Thus, it is possible to implement the memory system 1 with the queue of a smaller size.

Figure 7:
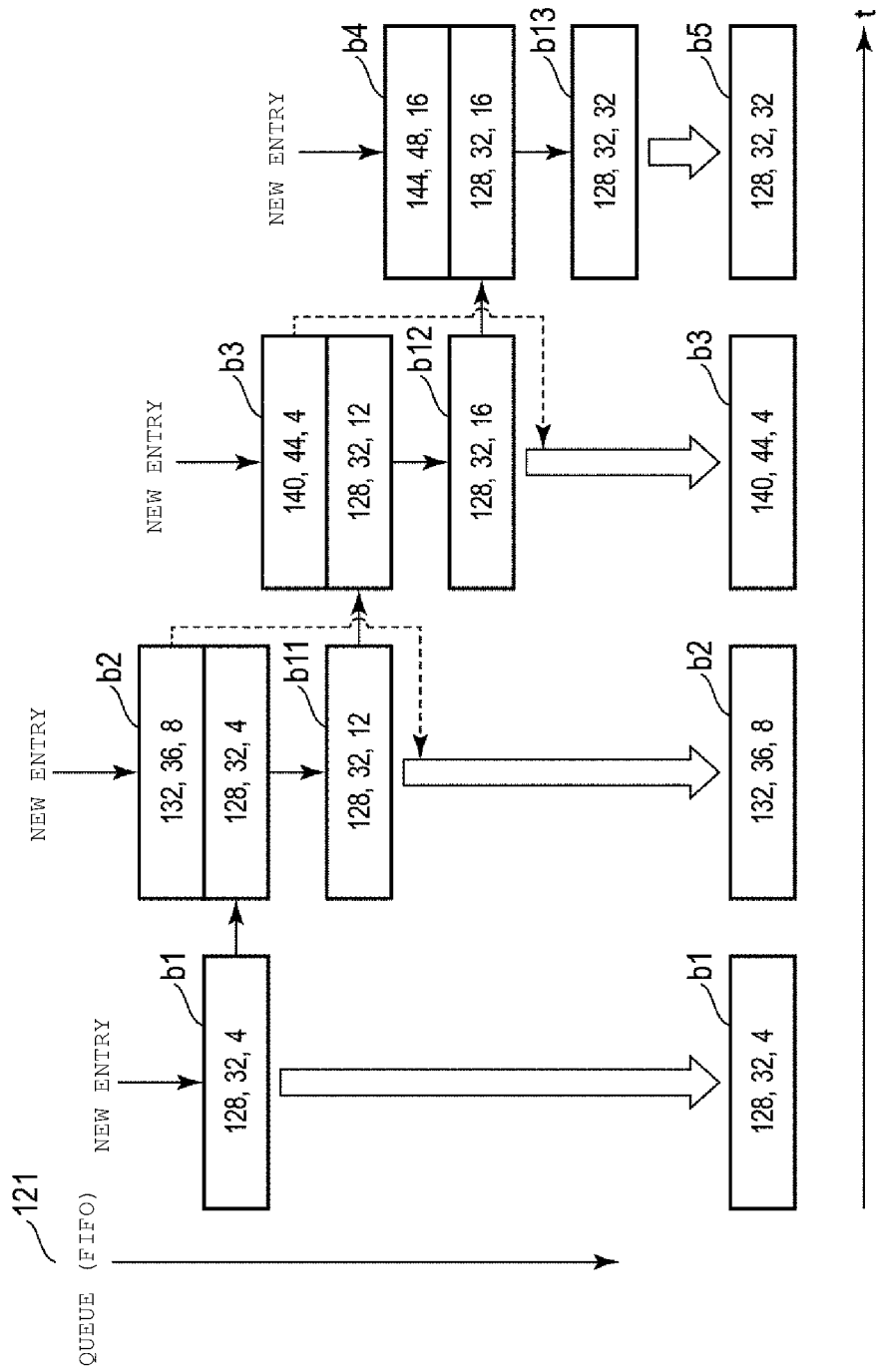
FIG. 7 is a diagram illustrating another modification example of the operation of the continuity determination module illustrated in FIG. 4.

Further, in the embodiment of the memory system 1, when update of the L2P table 131 is not completed, the write command of the host 2 may not be completed. In this case, as illustrated in FIG. 7, when new write address information is input to the queue 121 and the new write address information is information in which both the LBAs and the PBAs are continuous with the LBAs and the PBAs of the write address information which is already buffered in the queue 121, the continuity determination module 12 may integrate two pieces of write address information into one, and output the newly-input write address information from the queue 121 to the L2P management module 13.

Specifically, when write address information "128, 32, 4" (b1) is first input to the queue 121, the continuity determination module 12 buffers the write address information "128, 32, 4" (b1) in the queue 121, and outputs the write address information "128, 32, 4" (b1) to the L2P management module 13.

Next, when write address information "132, 36, 8" (b2) in which both the LBAs and the PBAs are continuous is input, the continuity determination module 12 integrates these two pieces of the write address information into write address information "128, 32, 12" (b11), and outputs the write address information "132, 36, 8" (b2) to the L2P management module 13.

Similarly, when write address information "140, 44, 4" (b3) is input, the continuity determination module 12 integrates the write address information "128, 32, 12" (b11) and the write address information "140, 44, 4" (b3) into write address information "128, 32, 16" (b12), and outputs the write address information "140, 44, 4" (b3) to the L2P management module 13.

When write address information "144, 48, 16" (b4) is input, the continuity determination module 12 integrates the write address information "128, 32, 16" (b12) and the write address information "144, 48, 16" (b4) into write address information "128, 32, 32" (b13). The write address information "128, 32, 32" (b13) corresponds to the write address information "128, 32, 32" (b5) of FIG. 4. The continuity determination module 12 outputs the write address information "128, 32, 32" (b5) from the queue 121 to the L2P management module 13.

The write address information "128, 32, 32" (b5) includes the write address information "144, 48, 16" (b4). Thus, the continuity determination module 12 does not need to output the write address information "144, 48, 16" (b4) to the L2P management module 13. Further, the write address information "128, 32, 32" (b5) is write address information having a full length (32) under the second node. Thus, all the pieces of information of the first nodes managed by the second node can be discarded, and information in which 32 PBAs are continuous is stored in the second node. Thereby, "pruning" can be performed. When pieces of the write address information b1 to b4 are respectively output, for the write address information b4, the L2P management module 13 needs to check whether the PBAs of all the first nodes managed by the second node are continuous.

Here, as an example of outputting newly-input write address information to the L2P management module 13 each time the write address information is newly input to the queue 121, an example of outputting newly-input write address information while integrating the newly-input write address information and the write address information buffered in the queue 121 is described. The present disclosure is not limited thereto. For example, as illustrated in FIG. 4, the continuity determination module 12 may output newly-input write address information while additionally buffering the newly-input write address information in the queue 121.

Figure 8:
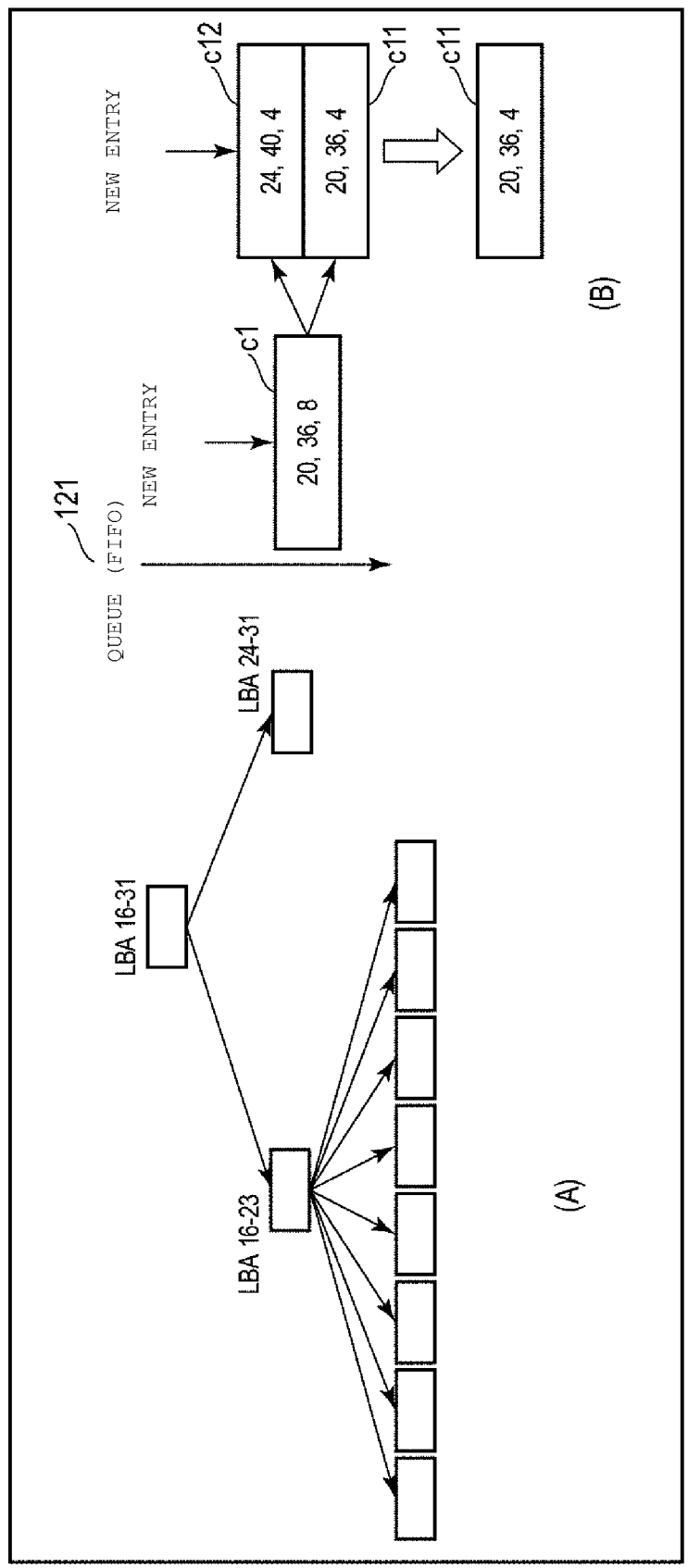
FIG. 8 is a diagram illustrating division of write address information that can be performed by the continuity determination module of the memory system according to the embodiment.

Further, the continuity determination module 12 preferably divides the write address information which is input to the queue 121 in accordance with a boundary of a management unit of the LBA of the second node, which is provided in the upper layer of the first nodes in the lowest layer of the hierarchical structure of the L2P table 131. For example, as illustrated in (A) in FIG. 8, it is assumed that a certain second node corresponds to LBA "16-23" and a subsequent second node corresponds to LBA "24-31". Under this assumption, for example, as illustrated in (B) in FIG. 8, it is assumed that write address information "20, 36, 8" (c1) is input to the queue 121. Since the write address information "20, 36, 8" (c1) is information related to LBAs "20-27", the write address information "20, 36, 8" (c1) extends over a boundary between the two second nodes illustrated in (A) in FIG. 8.

In this case, the continuity determination module 12 divides the write address information "20, 36, 8" (c1) into write address information "20, 36, 4" (c11) and write address information "20, 40, 4" (c12) in accordance with a boundary between the second nodes. The continuity determination module 12 outputs the front write address information "20, 36, 4" (c11) out of two pieces of divided write address information from the queue 121 to the L2P management module 13. The continuity determination module 12 buffers only the rear write address information "20, 40, 4" (c12) in the queue 121.

When the write address information "20, 36, 8" (c1) is input to the queue 121 and write address information is buffered in the queue 121, in a case where both the LBAs and the PBAs are continuous in these two pieces of write address information, the continuity determination module 12 integrates the write address information buffered in the queue 121 and the divided write address information (c11) into one, and outputs the integrated write address information. When at least one of the LBAs or the PBAs are discontinuous in these two pieces of write address information, the continuity determination module 12 individually outputs the write address information buffered in the queue 121 and the divided write address information (c11).

Based on the boundary of the hierarchical structure of the L2P table 131, efficient queuing of write address information that is suitable for "pruning" is achieved without waste.

In implementation of the queue 121, it is possible that write address information including continuous LBAs and continuous PBAs having a certain length is buffered in the queue 121 and then write address information indicating that a portion of the LBAs is overwritten is input to the queue 121. In this case, the LBAs and the PBAs of the write address information buffered in the queue 121 and the LBAs and the PBAs of the write address information which is newly input to the queue 121 are not continuous. In one possible implementation, the continuity determination module 12 may first output the write address information buffered in the queue 121 to the L2P management module 13. Thereafter, at a certain timing, the continuity determination module 12 may output the write address information which is newly input to the queue 121 to the L2P management module 13.

However, in that case, when these pieces of write address information are received, the L2P management module 13 updates the LBAs of the overwritten portion twice. Thus process results in a wasteful processing cost of the L2P table 131.

Figure 9:
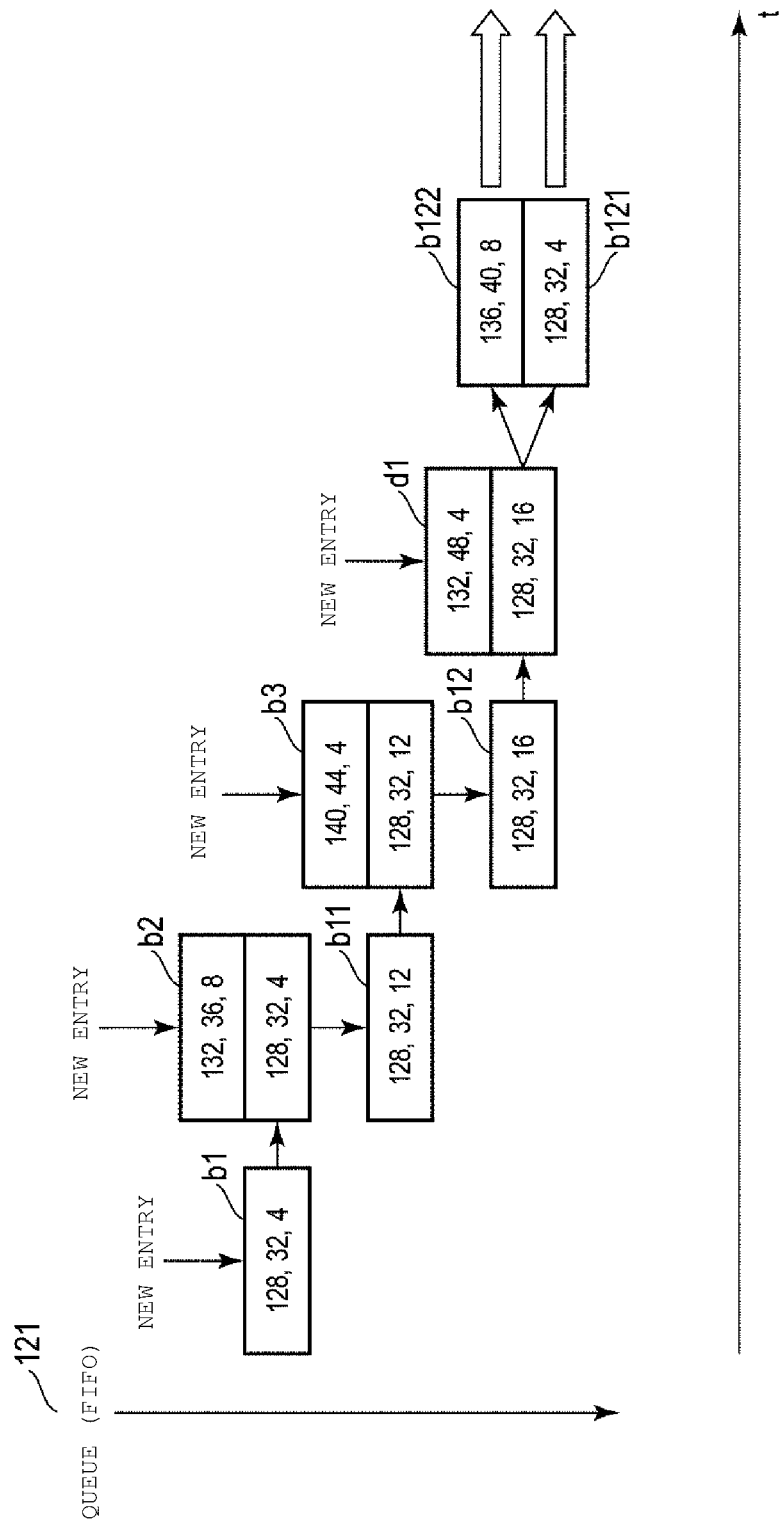
FIG. 9 is a diagram illustrating an example in which the continuity determination module of the memory system according to the embodiment handles data overwriting.

To address such an issue, in a preferred embodiment, as illustrated in FIG. 9, the continuity determination module 12 does not output the overwritten portion from the queue 121 to the L2P management module 13. Thereby, it is possible to avoid a wasteful processing cost of the L2P table 131 in the L2P management module 13.

Specifically, for example, in the procedure described with reference to FIG. 6, it is assumed that the write address information "128, 32, 16" (b12) is buffered in the queue 121 and write address information "132, 48, 4" (d1) is newly input to the queue 121. The write address information "132, 48, 4" (d1) means that data writing for updating data of PBAs "36- 39 (36, 4)" to data of PBAs "48-51 (48, 4)" with respect to LBAs "132-135 (132, 4)" of LBAs "128-148" indicated by the write address information "128, 32, 16" (b12) is to be performed. Apparently, the range of the write address information "132, 48, 4" (d1) is within the range of the write address information "128, 32, 16" (b12).

In this case, when the write address information "128, 32, 16" (b12) and the write address information "132, 48, 4" (d1) are individually output because the LBAs and the PBAs are not continuous, the L2P management module 13 updates a correspondence of the LBAs "132-135 (132, 4)" to the PBAs "36-39 (36, 4)", and updates again a correspondence of the PBAs "36-39 (36, 4)" to the PBAs "48-51 (48, 4)". Since double update of the LBAs "132-135 (132, 4)" is wasteful, in order to eliminate this waste, the continuity determination module 12 processes a write entry b12 in the queue 121 and then outputs the processed write entry b12.

Specifically, the continuity determination module 12 first divides the write address information "128, 32, 16" (b12) buffered in the queue 121 into write address information "128, 32, 4" (b121) and write address information "136, 40, 8" (b122) so as to exclude (may be referred to as remove) an overlapping portion with the write address information "132, 48, 4" (d1), and outputs pieces of the divided write address information from the queue 121 to the L2P management module 13. In other words, the write address information "128, 32, 4" (b121) and the write address information "128, 32, 4" (b121) correspond to the combination of the write address information "132, 48, 4" (d1), which encompasses the range of the write address information "132, 48, 4" (d1) minus the overlapping portion. Further, the write address information "132, 48, 4" (d1) is stored in the queue 121.

In this case, the L2P management module 13 updates the PBAs related to the LBAs "128-131" and updates the PBAs related to the LBAs "136-143". Thereby, waste such as double updating of the LBAs "132-135 (132, 4)" can be eliminated, and the processing cost for the L2P table 131 can be reduced.

Figure 10:
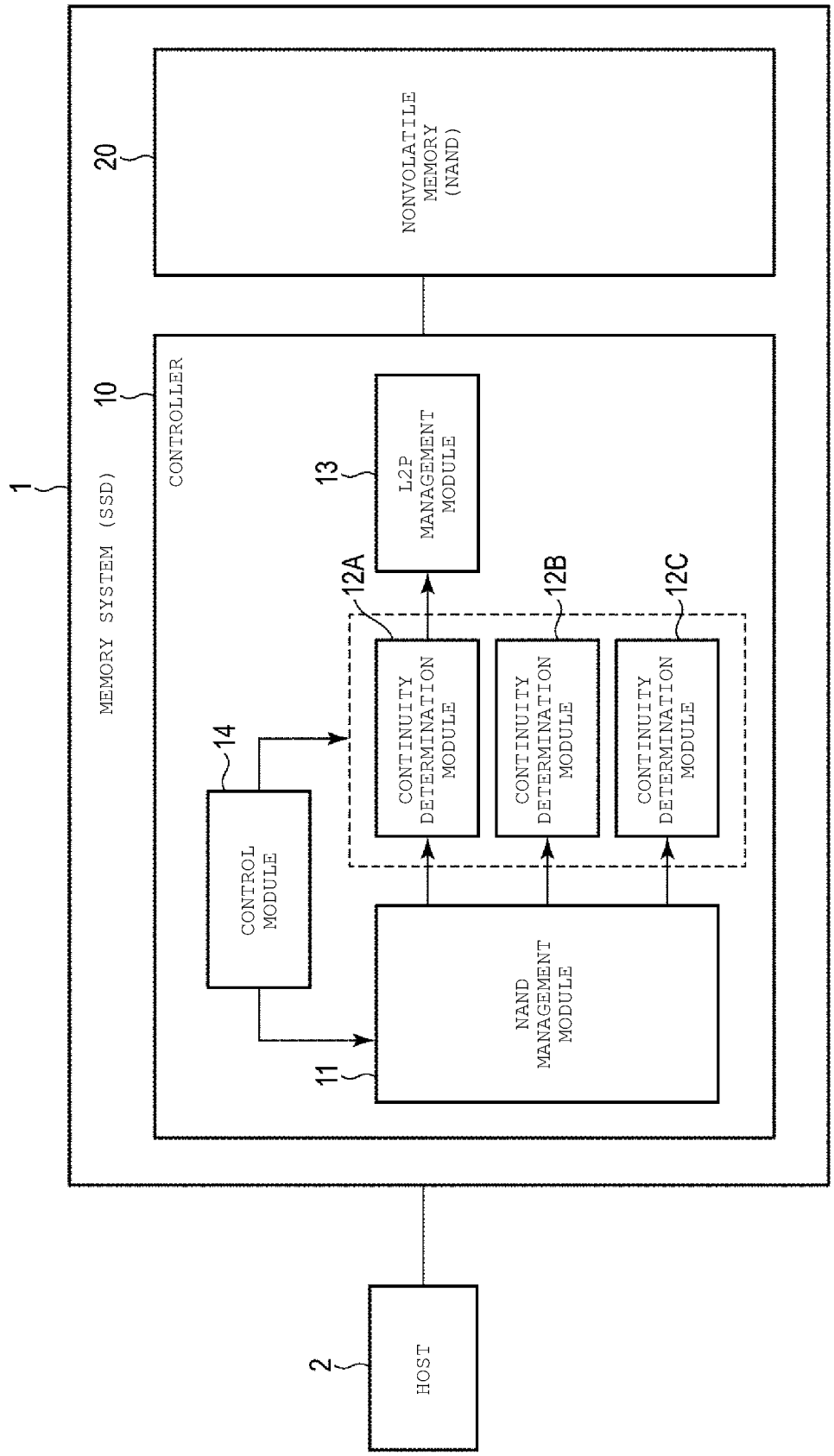
FIG. 10 is a diagram illustrating a configuration example of a memory system according to the embodiment, which includes a plurality of continuity determination modules.

Further, FIG. 1 illustrates an example in which only one continuity determination module 12 is provided. However, the present disclosure is not limited thereto, and as illustrated in FIG. 10, a plurality of continuity determination modules 12 (12A, 12B, and 12C) may be provided. In this case, preferably, a control module 14 for collectively controlling the plurality of continuity determination modules 12 is provided.

The control module 14 controls, for example, assigning the continuity determination module 12 to a logical block (super block) to be described later in a predetermined state (an open state to be described below). Here, the logical block will be described.

Figure 11:
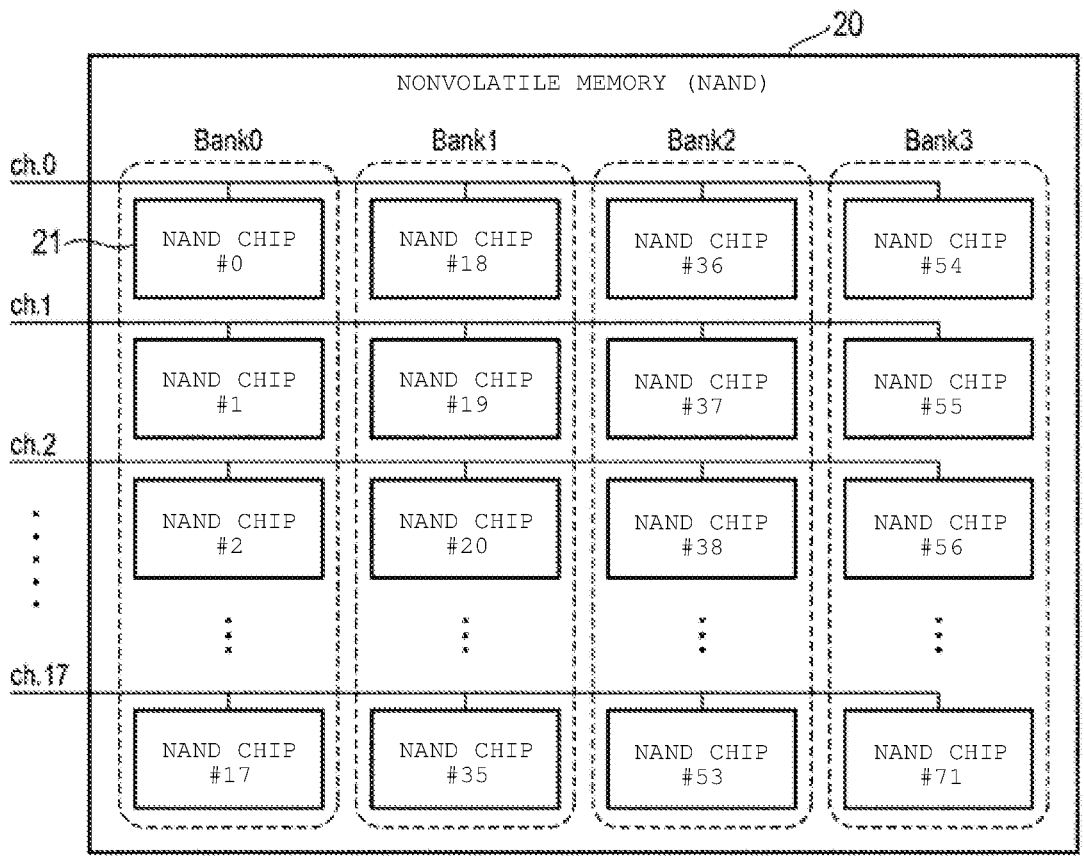
FIG. 11 is a diagram illustrating a configuration example of a nonvolatile memory provided in the memory system according to the embodiment.

FIG. 11 is a diagram illustrating a configuration example of the nonvolatile memory 20.

As illustrated in FIG. 11, the nonvolatile memory 20 includes a plurality of NAND chips 21. Each of the plurality of NAND chips 21 includes a memory cell array that includes a plurality of memory cells and can store data in a nonvolatile manner, and a peripheral circuit that controls the memory cell array. Each of the NAND chips 21 can operate independently. That is, the NAND chip 21 functions as a parallel operation unit. A plurality of NAND chips 21 are connected to each of a plurality of channels (for example, 18 channels Ch.0 to Ch.17) in the same number (for example, 4 per channel). Each of the channels Ch.0 to Ch.17 includes a communication line (memory bus) for allowing the controller 10 to perform communication with each NAND chip 21.

For example, the 18 NAND chips 21 are connected to the channels Ch.0 to Ch.17 in parallel as a group. That is, the NAND chips #0 to #17, the NAND chips #18 to #35, the NAND chips #36 to #53, and the NAND chips #54 to #71 may be respectively organized as banks (banks 0 to 3). The bank functions as a unit for operating the plurality of NAND chips 21 in parallel by bank interleaving. In the configuration example illustrated in FIG. 11, up to 72 NAND chips 21 can be operated in parallel by bank interleaving using 18 channels and 4 banks.

Figure 12:
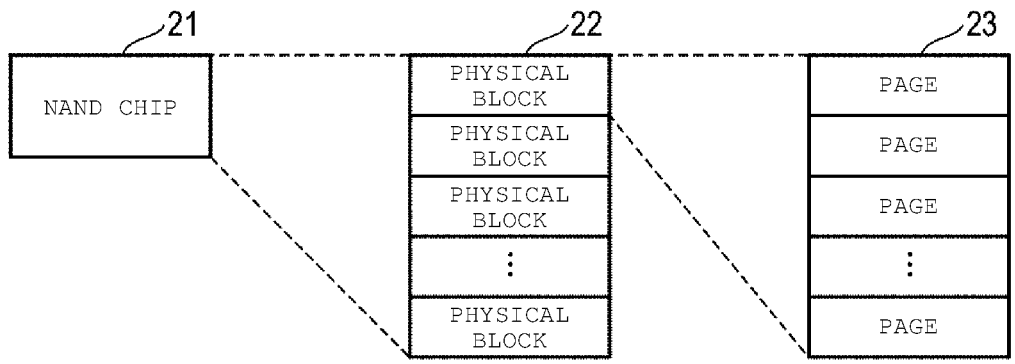
FIG. 12 is a diagram illustrating a configuration example of NAND chips provided in the nonvolatile memory of the memory system according to the embodiment.

FIG. 12 is a diagram illustrating a configuration example of the NAND chip 21.

As illustrated in FIG. 12, each of the NAND chips 21 includes a plurality of physical blocks 22, each of which includes a plurality of pages 23. Data writing and data reading are processed in units of page 23. On the other hand, data erasing is processed in units of the physical block 22. Data cannot be overwritten on the page 23 on which data is written. Thus, data update is performed by invalidating original data on a certain page 23 and writing new data on another page 23. Processing for reusing a page 23 on which invalidated data remains in the physical block 22 is called garbage collection (compaction) or the like.

Figure 13:
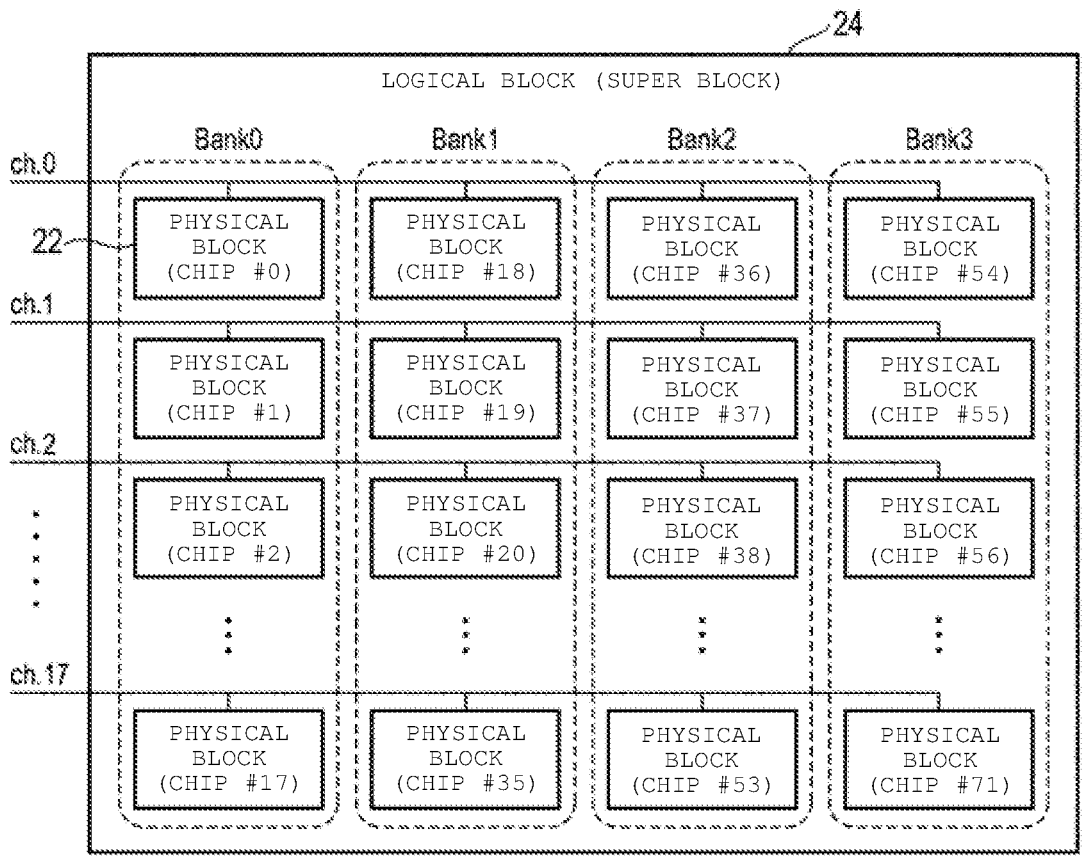
FIG. 13 is a diagram illustrating a configuration example of a logical block generated in the memory system according to the embodiment.

FIG. 13 is a diagram illustrating a configuration example of a logical block (super block) generated by the NAND management module 11.

The NAND management module 11 generates a plurality of logical blocks 24, each of which includes a plurality of physical blocks 22. In the memory system 1 according to the embodiment, data is erased in units of the logical block 24. Specifically, data processed in units of the physical block 22 described above, whereas data corresponding to one logical block 24 is collectively erased.

The NAND management module 11 selects the physical blocks 22 one by one from, for example, the NAND chips (#0 to #71) 21, and manages the logical block 24 including total 72 physical blocks 22. The NAND chips (#0 to #71) 21 can be operated in parallel by 18 channels and 4 banks interleaving. Thus, data writing to one logical block 24 can be executed by, for example, 72 pages 23 at a time. The NAND management module 11 may select the physical blocks 22 one by one from the number smaller than 72 (for example, 36 or 18) NAND chips 21 and manage the logical block 24. Preferably, a combination of the NAND chips 21 with respect to one logical block 24 is selected in different channels and different banks. When each NAND chip 21 has a multi-plane (for example, two-plane) configuration, the NAND management module 11 may select the physical blocks 22 one by one from, for example, 144 planes corresponding to the NAND chips (#0 to #71) 21, and generate a logical block 24 including total 144 physical blocks 22. The NAND management module 11 manages the PBAs of the nonvolatile memory 20 such that the PBAs in the logical block 24 are continuous, the logical block 24 being generated using the plurality of physical blocks 22 collected from the plurality of NAND chips 21.

Figure 14:
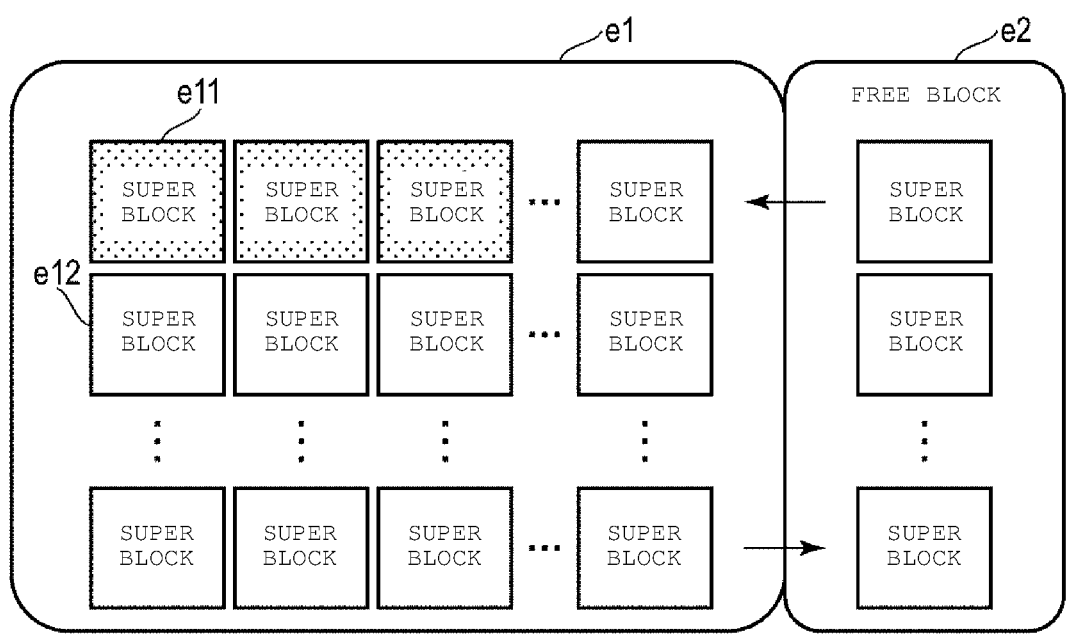
FIG. 14 is a diagram illustrating an example of a transition of a state of a logical block generated in the memory system according to the embodiment.

FIG. 14 is a diagram illustrating an example of a transition of a state of the logical block (super block) 24 generated by the NAND management module 11.

The logical block 24 can have two states, a used state (a1) and an unused state (a2). The logical block 24 in a used state is further roughly classified into a state in which data is to be written (may be referred to as an "open state" or "writable state") and a state in which data writing is completed (may be referred to as a "closed state" or "non-writable state"). The number of logical blocks 24 that can be in the open state at the same time is predetermined as a specification of the memory system 1. Here, it is assumed that three hatched logical blocks 24 indicated by a reference numeral e11 are in the open state. It is assumed that the other logical blocks 24 which are not hatched and are indicated by a reference numeral e12 are in the closed state. For example, in a case where a plurality of application programs are operated on the host 2, when the logical blocks 24 to which data is to be written are divided for each application program, it is possible to improve response performance and the like as compared with a case where pieces of data for a plurality of application programs are mixed in one logical block 24.

The logical block 24 in the unused state is also referred to as a free block. When the logical block 24 in the open state is filled with write data, the NAND management module 11 causes the logical block 24 to transition from the open state to the closed state. Next, the NAND management module 11 selects one logical block 24 in the unused state, and causes the logical block 24 to transition from the unused state to the open state.

Further, as described above, data update in the nonvolatile memory 20 is performed by invalidating original data on a certain page 23 and writing new data on another page 23. For this reason, there may be a state where a certain logical block 24 is mostly occupied by unnecessary data (i.e., invalid data). A ratio of valid data to the logical block 24 is referred to as a valid cluster ratio or the like. The above-described garbage collection is executed, for example, for the logical block 24 having a low valid cluster ratio.

Specifically, the NAND management module 11 selects N (N is a natural number equal to or larger than two) logical blocks 24, for example, in ascending order of the valid cluster ratio, and moves valid data in the N logical blocks 24 to less than N logical blocks 24. At this time, less than N logical blocks 24 transition from the unused state to the used state, while pieces of data in the N logical blocks 24 are erased and the N logical blocks 24 transition from the used state to the unused state. Thereby, one or more (N—less than N) logical blocks 24 in the unused state are created. In other words, pages 23 of one or more logical blocks 24 can be reused.

In this way, the logical block 24 cyclically transitions in an order of unused state→used state (open state)→used state (closed state)→unused state→ . . . .

The control module 14 assigns each of the plurality of continuity determination modules 12 (12A, 12B, and 12C) to the logical block 24 in the open state in cooperation with the NAND management module 11. Therefore, the number of provided continuity determination modules 12 is equal to or smaller than the number of logical blocks 24 that can be in the open state at the same time, which is predetermined as a specification of the memory system 1. When data is written to a certain logical block 24, the NAND management module 11 outputs the write address information to the continuity determination module 12 assigned to the logical block 24.

As described above, the NAND management module 11 manages the PBAs in the logical block 24 such that the PBAs are continuous. Therefore, when write address information is buffered in the queue 121, the continuity determination module 12 may calculate only a next-expected LBA from the write address information, and refer to only the LBA out of the LBA and the PBA of the write address information which is newly input to the queue 121.

Figure 15:
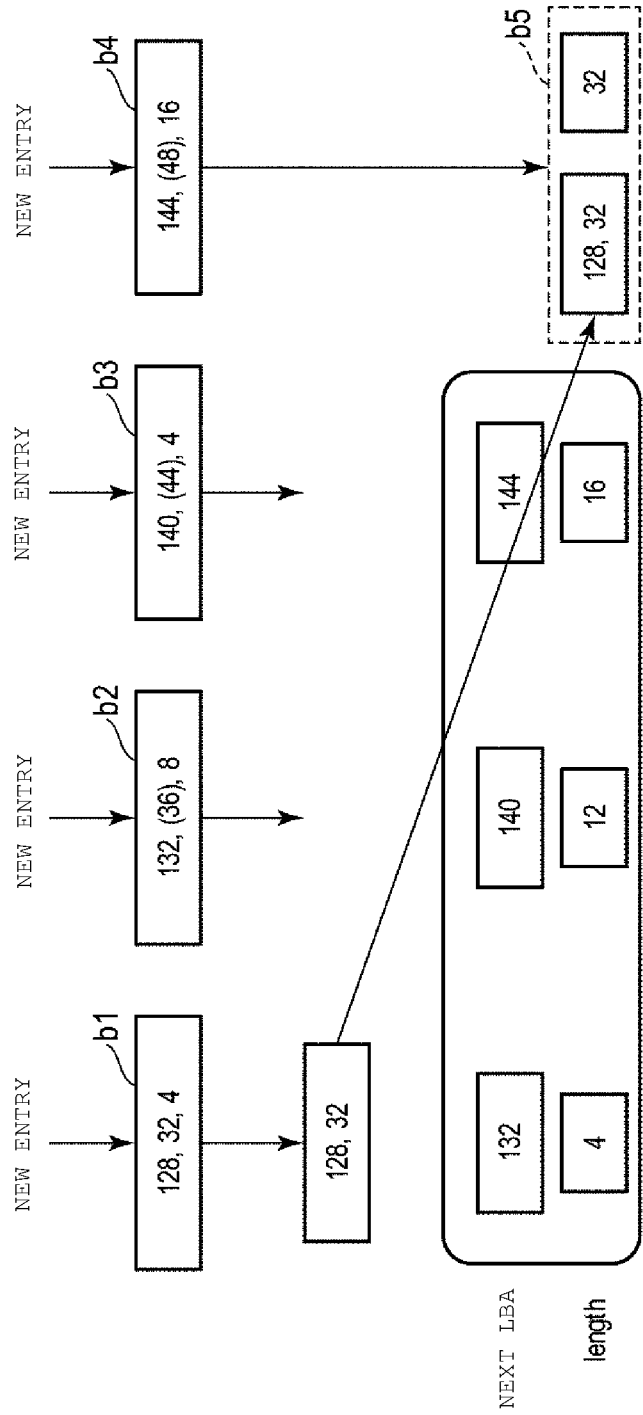
FIG. 15 is a diagram illustrating an example of an operation in a state where the plurality of continuity determination modules illustrated in FIG. 10 are assigned to logical blocks.

FIG. 15 is a diagram illustrating an example of an operation of the continuity determination module 12 in a state where the logical block 24 is assigned.

FIG. 15 illustrates an example in which write address information "128, 32, 4" (b1) is first input to the queue 121. At this time, the continuity determination module 12 stores a next-expected LBA "132 (=128+4)" and a length "4".

Subsequently, when write address information "132, 36, 8" (b2) is newly input to the queue 121, the continuity determination module 12 only determines whether or not the LBAs are continuous. Here, it is determined that the LBAs are continuous. Thus, the continuity determination module 12 stores a next-expected LBA "140 (=132+8)" and a length "12 (=4+8)".

Similarly, when write address information "140, 44, 4" (b3) is newly input to the queue 121, the continuity determination module 12 only determines whether or not the LBAs are continuous. Here, it is determined that the LBAs are continuous. Thus, the continuity determination module 12 stores a next-expected LBA "144 (=140+4)" and a length "16 (=12+4)".

Further, when write address information "144, 48, 16" (b4) in which the LBAs are continuous is newly input to the queue 121, a total length (32 (=16+16)) reaches a corresponding length of the second node provided in the upper layer of the first nodes. In FIG. 15, it is also assumed that 32 first nodes exist in the lower layer of the second node.

The continuity determination module 12 generates write address information "128, 32, 32" (b5) including the LBA and the PBA of the write address information "128, 32, 4" (b1) and the total length (32), and outputs the generated write address information to the L2P management module 13.

In this way, by assigning the continuity determination module 12 (queue 121) to each of one or more logical blocks 24, it is only necessary to monitor the LBA. Thus, the processing cost related to the L2P table 131 can be further reduced.

Further, when the logical block 24 in the open state transitions to the closed state, the control module 14 instructs the continuity determination module 12 assigned to the logical block 24 to output the write address information buffered in the queue 121. When the output of the write address information is completed, the control module 14 invalidates the assignment of the continuity determination module 12 to the logical block 24 (may be referred to as dissociates the continuity determination module 12 from the logical block 24). The control module 14 assigns the continuity determination module 12 to the logical block 24 that transitions from an unused state to a used state (open state).

The continuity determination module 12 may not necessarily have to be assigned to the logical block 24 by one-to-one correspondence. For example, one continuity determination module 12 may be assigned to the logical block 24 that is predicted to have a high access frequency, and one continuity determination module 12 may be assigned to the rest of the plurality of logical blocks 24. That is, the number of provided continuity determination modules 12 may be less than the number of logical blocks 24 that can be in the open state at the same time. A method for predicting the access frequency is not limited to a specific method, and various known methods may be applied.

Further, one continuity determination module 12 among the plurality of the continuity determination modules 12 may be assigned to the logical block 24 used for data writing for garbage collection. In this case, in data writing by garbage collection, a length when the continuous PBAs are correlated with the continuous LBAs tends to be longer than a length in data writing by a write command from the host 2. For that reason, the continuity determination module 12 assigned to the logical block 24 may increase a length of the write address information buffered in the queue 121.

Specifically, in an implementation, when the total length reaches the corresponding length of the second node, the write address information may be output from the queue 121. In another implementation, when the total length reaches the corresponding length of the third node provided in the upper layer of the second node, the write address information may be output from the queue 121. That is, a unit of "pruning" may be variable.

As described above, the memory system 1 according to the embodiment includes the continuity determination module 12 that appropriately processes the write address information between the NAND management module 11 and the L2P management module 13. Thereby, it is possible to reduce the processing cost of the L2P table 131.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
 a nonvolatile memory; and
 a controller configured to control the nonvolatile memory based on an address conversion table, the controller configured to:
  generate first address mapping information indicating a first logical address range and a first physical address range corresponding thereto, and then second address mapping information indicating a second logical address range and a second physical address range corresponding thereto;
  determine whether the first and second logical address ranges are continuous and the first and second physical address ranges are continuous;
  determine whether a total of the first logical address range and the second logical address range is greater than a threshold value;
  upon determining that at least one of the first and second logical address ranges and the first and second physical address ranges is not continuous or that the total is smaller than or equal to the threshold value, update the address conversion table based on the first address mapping information; and
  upon determining that the first and second logical address ranges are continuous and the first and second physical address ranges are continuous and that the total is greater than the threshold value, generate an integrated address mapping information using the first and second address mapping information and update the address conversion table based on the integrated address mapping information.

2. The memory system according to claim 1, wherein the first address mapping information includes a first logical address, a first physical address, and a first address length, and
 the second address mapping information includes a second logical address, a second physical address, and a second address length.

3. The memory system according to claim 1, wherein the controller is further configured to:
 generate third address mapping information indicating a third logical address range and a third physical address range corresponding thereto;
 determine whether an integrated logical address range of the integrated address mapping information and the third logical address range are continuous and an integrated physical address range of the integrated address mapping information and the third physical address range are continuous;
 upon determining that at least one of the integrated logical address range and the third logical address range, and the integrated physical address range and the third physical address range is not continuous, update the address conversion table based on the integrated address mapping information; and
 upon determining that the integrated logical address range and the third logical address range are continuous and the integrated physical address range and the third physical address range are continuous, generate another integrated address mapping information using the integrated address mapping information and the third address mapping information and update the address conversion table based on the another integrated address mapping information.

4. The memory system according to claim 1, wherein the controller is further configured to:
 determine whether there is an overlap between the first and second logical address ranges; and
 upon determining that there is the overlap, generate subtracted address mapping information by combining the first and second logical address ranges after removing the overlap from the second address range and update the address conversion table based on the subtracted address mapping information.

5. The memory system according to claim 1, wherein the controller is further configured to:
 enter, in a queue, the first address mapping information and then the second address mapping information; and
 upon determining that at least one of the first and second logical address ranges and the first and second physical address ranges is not continuous, remove the first address mapping information from the queue and leave the second address mapping information in the queue.

6. The memory system according to claim 5, wherein the controller is further configured to:
 upon determining that the first and second logical address ranges are continuous and the first and second physical address ranges are continuous, remove the first and second address mapping information from the queue.

7. The memory system according to claim 6, wherein the controller is further configured to:
 upon determining that the first and second logical address ranges are continuous and the first and second physical address ranges are continuous, enter the integrated address mapping information in the queue.

8. A memory system comprising:
 a nonvolatile memory; and
 a controller configured to control the nonvolatile memory based on an address conversion table, the controller configured to:
  generate first address mapping information indicating a first logical address range and a first physical address range corresponding thereto, and then second address mapping information indicating a second logical address range and a second physical address range corresponding thereto;
  determine whether the first and second logical address ranges are continuous and the first and second physical address ranges are continuous;
  upon determining that at least one of the first and second logical address ranges and the first and second physical address ranges is not continuous, update the address conversion table based on the first address mapping information; and
  upon determining that the first and second logical address ranges are continuous and the first and second physical address ranges are continuous, generate an integrated address mapping information using the first and second address mapping information and update the address conversion table based on the integrated address mapping information, wherein the address conversion table comprises a plurality of nodes arranged in a hierarchy, the nodes including first nodes at a first hierarchical level and second nodes at a second hierarchical level higher than the first hierarchical level, each of the first nodes representing a one-to-one correspondence between a plurality of logical addresses and a plurality of physical addresses, respectively, and each of the second nodes representing a continuous logical address range, and the controller is further configured to, during update of the address conversion table:
determine that physical addresses corresponding to a logical address range represented by one of the second nodes are continuous; and
upon determining that the physical addresses are continuous, clear data in first nodes that are descendants of the one of the second nodes and modify the one of the second nodes to represent a larger range of the continuous logical addresses.

9. The memory system according to claim 8, wherein the controller is further configured to:
determine whether the first logical address range extends over logical address ranges of multiple second nodes; and
upon determining that the first logical address range extends over logical address ranges of multiple second nodes, split the first address mapping information into multiple pieces of address mapping information.

10. The memory system according to claim 8, wherein the controller is further configured to:
determine whether an integrated logical address range of the integrated address mapping information extends over logical address ranges of multiple second nodes; and
upon determining that the integrated logical address range of the integrated address mapping information extends over logical address ranges of multiple second nodes, split the integrated address mapping information into multiple pieces of address mapping information.

11. The memory system according to claim 8, wherein the address conversion table further comprises one or more third nodes at a third hierarchical level higher than the second hierarchical level to indicate a continuous logical address range including logical address ranges of multiple second nodes.

12. The memory system according to claim 8, wherein the controller is further configured to determine that a total of the first logical address range and the second logical address range is greater than a threshold value, and
the controller generates the integrated address mapping information upon determining that the total is greater than the threshold value.

13. A memory system comprising:
a nonvolatile memory; and
a controller configured to control the nonvolatile memory based on an address conversion table, the controller configured to:
generate first address mapping information indicating a first logical address range and a first physical address range corresponding thereto, and then second address mapping information indicating a second logical address range and a second physical address range corresponding thereto;
determine whether the first and second logical address ranges are continuous and the first and second physical address ranges are continuous;
upon determining that at least one of the first and second logical address ranges and the first and second physical address ranges is not continuous, update the address conversion table based on the first address mapping information; and
upon determining that the first and second logical address ranges are continuous and the first and second physical address ranges are continuous, generate an integrated address mapping information using the first and second address mapping information and update the address conversion table based on the integrated address mapping information, wherein the controller includes a plurality of queues associated with a plurality of logical blocks of the nonvolatile memory, respectively, the controller is configured to enter the first address mapping information in one of the queues associated with a logical block corresponding to the first physical address range, and the second address mapping information in one of the queues associated with a logical block corresponding to the second physical address range, and update the address conversion table with respect to each of the queues.

14. The memory system according to claim 13, wherein the plurality of queues consists of a predetermined number of queues, and
the controller is configured to:
set the predetermined number of the logical blocks to a writable state and the other of the logical blocks to a non-writable state; and
associate the predetermined number of queues with the predetermined number of the logical blocks in the writable state, respectively.

15. The memory system according to claim 14, wherein when one of the logical blocks in the writable state transitions to the non-writable state, the controller updates the address conversion table based on address mapping information in one of the queues associated therewith, and dissociates the one of queues from the one of the logical blocks.

16. The memory system according to claim 14, wherein the controller is further configured to perform a garbage collection to integrate valid data in a plurality of logical blocks into one of the logical blocks in the writable state.

17. The memory system according to claim 13, wherein the first address mapping information includes a first logical address, a first physical address, and a first address length, and
the second address mapping information includes a second logical address, a second physical address, and a second address length.

18. The memory system according to claim 13, wherein the controller is further configured to:
generate third address mapping information indicating a third logical address range and a third physical address range corresponding thereto;
determine whether an integrated logical address range of the integrated address mapping information and the third logical address range are continuous and an integrated physical address range of the integrated address mapping information and the third physical address range are continuous;

upon determining that at least one of the integrated logical address range and the third logical address range, and the integrated physical address range and the third physical address range is not continuous, update the address conversion table based on the integrated address mapping information; and upon determining that the integrated logical address range and the third logical address range are continuous and the integrated physical address range and the third physical address range are continuous, generate another integrated address mapping information using the integrated address mapping information and the third address mapping information and update the address conversion table based on the another integrated address mapping information.

19. The memory system according to claim 13, wherein the controller is further configured to:

determine whether there is an overlap between the first and second logical address ranges; and upon determining that there is the overlap, generate subtracted address mapping information by combining the first and second logical address ranges after removing the overlap from the second address range and update the address conversion table based on the subtracted address mapping information.

20. The memory system according to claim 13, wherein the controller is further configured to:

enter, in a queue, the first address mapping information and then the second address mapping information; and upon determining that at least one of the first and second logical address ranges and the first and second physical address ranges is not continuous, remove the first address mapping information from the queue and leave the second address mapping information in the queue.

* * * * *